US007431224B2

(12) United States Patent
Laker

(10) Patent No.: US 7,431,224 B2
(45) Date of Patent: Oct. 7, 2008

(54) FLUID CONTROL DEVICE

(76) Inventor: Jonathan Paul Laker, Flat 3, 96 Queen's Road, Felixstowe (GB) IP11 7PG ( * ) Notice: Subject to any disclaimer, the term of this patent is extended or adjusted under 35 U.S.C. 154(b) by 523 days.

(21) Appl. No.: 10/540,602

(22) PCT Filed: Dec. 29, 2003

(86) PCT No.: PCT/GB03/05720

§ 371 (c)(1),
(2), (4) Date: Jun. 27, 2005

(87) PCT Pub. No.: WO2004/060573

PCT Pub. Date: Jul. 22, 2004

(65) Prior Publication Data

US 2006/0151635 A1 Jul. 13, 2006

(30) Foreign Application Priority Data

Jan. 3, 2003 (GB) ................................ 0300024.7

(51) Int. Cl.

| | |
|---|---|
| ***B05B 1/30*** | (2006.01) |
| ***B05B 1/34*** | (2006.01) |
| ***B05B 1/14*** | (2006.01) |
| ***G05D 7/01*** | (2006.01) |

(52) U.S. Cl. .................... 239/533.1; 239/552; 239/553; 239/553.5; 239/569; 239/575; 239/DIG. 23; 138/43; 138/46

(58) Field of Classification Search ................. 239/106, 239/107, 428.5, 533.1, 533.13, 569, 570, 239/571, 574, 575, 552, 553, 553.5, DIG. 23; 222/494; 137/49, 50, 68.23, 68.25, 70, 80.03, 137/100, 115.01, 115.03, 115.04, 115.13, 137/116.5, 118.04, 469, 494, 497, 513.3, 137/513.5, 513.7; 138/43, 46

See application file for complete search history.

(56) References Cited

U.S. PATENT DOCUMENTS

| | | | | |
|---|---|---|---|---|
| 4,000,857 | A * | 1/1977 | Moen | 239/428.5 |
| 4,275,843 | A * | 6/1981 | Moen | 239/499 |
| 4,364,523 | A * | 12/1982 | Parkison et al. | 239/533.14 |
| 4,562,960 | A | 1/1986 | Marty et al. | |
| 5,114,072 | A | 5/1992 | Barhydt, Sr. | |
| 5,307,955 | A | 5/1994 | Viegas | |
| 5,439,143 | A * | 8/1995 | Brown et al. | 222/185.1 |
| 6,273,128 | B1 | 8/2001 | Paczonay | |
| 6,631,737 | B1 * | 10/2003 | Kipping | 138/43 |

FOREIGN PATENT DOCUMENTS

| | | | |
|---|---|---|---|
| EP | 1078692 | | 2/2001 |
| EP | 1166703 | | 1/2002 |
| GB | 966137 | | 8/1964 |
| JP | 3012249 | | 1/1991 |
| JP | 03012249 | * | 3/1991 |

* cited by examiner

*Primary Examiner*—Len Tran
*Assistant Examiner*—Ryan Reis
(74) *Attorney, Agent, or Firm*—David A. Guerra

(57) ABSTRACT

The present invention provides a device for reducing the amount of water or other fluid discharged at a tap (4), which device comprises a body member (1) having an inlet adapted to be connected to a supply of water or other fluid, dual outlets through which the fluid is to be discharged to the locus, one fluid path between said inlet and said outlet is controlled by a flow/pressure responsive valve mechanism (10) located in the inner fluid path (9) between said inlet and outlet.

20 Claims, 12 Drawing Sheets

FLUID CONTROL DEVICE

CROSS-REFERENCE TO RELATED APPLICATIONS

This application is an U.S. national phase application under 35 U.S.C. §371 based upon co-pending International Application No. PCT/GB2003/005720 filed on Dec. 29, 2003. Additionally, this U.S. national phase application claims the benefit of priority of co-pending International Application No. PCT/GB2003/005720 filed on Dec. 29, 2003 and Great Britain Application No. 0300024.7 filed on Jan. 3, 2003. The entire disclosures of the prior applications are incorporated herein by reference. The international application was published on Jul. 22, 2004 under Publication No. WO 2004/060573.

The present invention relates to a device, notably to a flow responsive device for fitting to the outlet of a water tap.

A conventional water tap for controlling the supply of water or other fluid to a locus comprises an inlet adapted to be connected to the water mains or other supply of water or other fluid; a valve mechanism for controlling the flow of water through the tap; and an outlet orifice through which the flow of water discharges to the locus, for example into a basin, bath or the like. Such taps can take many forms and can be connected to both hot and cold water supplies to produce a mixed outlet stream of hot and cold water at some intermediate temperature. For convenience, the term tap will be used herein to denote in general all forms of such taps.

Such taps find use wherever a user desires to control the supply of water or other fluid to a locus, such as a hand basin or bath. However, the invention is of especial application in the supply of hot and/or cold water in a domestic situation and will be described hereinafter in terms of such an application.

It has become common practice to fit the outlet to the tap with an insert which aids even distribution of the outlet flow across the transverse area of the outlet orifice. Such inserts also aid uniform mixing of hot and cold-water to minimise the risk that the user may scald his hands if the hot water stream is not adequately mixed with the cold water stream. Typically, such inserts take the form of a transverse metal, plastic or ceramic plug which is a push, screw or other fit into the outlet orifice and which has a plurality of axial bores through the plug. The bores are sized and located so that when the tap valve is fully open there is a uniform flow of water across the plug giving a generally cylindrical jet of water from the tap. Typically, the combined cross sectional area of the bores in the plug is marginally less than that required to accommodate the full flow rate of water through the valve mechanism so that the plug causes a small back pressure at the tap outlet to create a jet of water from the tap.

However, when the tap valve is only partially opened, the combined cross sectional area of the bores in the plug exceeds that required to accommodate the flow of water through the plug. The water then issues from the tap outlet as slow flow of water due to the lack of pressure drop across the plug. Since the plane of the tap outlet is usually inclined at from 5 to 15° to the horizontal to project the jet of water from the tap towards the centre of the basin it serves, the slow flow of water does not fill the outlet orifice, but issues as a shallow flow over an arc at the lower portion of the plug. This shallow flow of water not only gives the appearance of a slow rate of flow of the water, but is aesthetically unacceptable to a user since the flow is in the form of a sluggish dribble from the tap.

Therefore, most users will tend to open the valve of the tap further to achieve an aesthetically pleasing full jet of water from the tap outlet. This is wasteful of water, especially where the user only intermittently uses the water, for example in wetting a toothbrush or wetting his hands when washing his face. Furthermore, in opening the valve of a hot tap fully, there is a greater risk of the user scalding himself where the water is at an elevated temperature and is not mixed with cold water in a mixer tap.

It has been proposed to incorporate a flow/pressure responsive device in the tap outlet which controls the outflow of water when the tap valve is only partially opened, thus causing the water to issue as an array of jets at low flow rates; but allows a full flow of water when the tap valve is fully open.

Thus, in British Patent No 2 063 104 B a shower head is provided with a spring loaded obturator at its outlet. The obturator moves against the spring bias away from its seat in the shower head as the water flow and hence the water pressure applied to its upstream face increases. This movement increases the size of the annular gap between the obturator and the body of the shower head to provide a larger flow path to accommodate the larger flow rate fed to the shower head. However, the obturator in such a design will tend to move rapidly in response to fluctuations in the water flow and/or water pressure applied to its upstream face. Hence, there is a tendency for the outflow of water from such a design to fluctuate and in an extreme case the flow can oscillate between the maximum and minimum flow rate causing hammering within the device and associated pipe work.

We believe that once the obturator has moved in response to the initial increase in pressure on its upstream face, there will be little or no pressure drop across the obturator since the outlet and the upstream passages in the shower head are all vented to atmospheric pressure. The obturator will thus be free to move under the influence of the bias spring resulting in rapid shutting of the annular outlet gap by the obturator. This causes a rapid build up of pressure upstream of the obturator causing the obturator to move rapidly to the open position, repeating the cycle of opening and shutting movement of the obturator.

It has also been proposed, for example in U.S. Pat. No. 5,114,072, to introduce air into the water stream to give a soft aerated flow of water, particularly in shower heads. This is achieved in a ported plug which is inserted into or formed within the outlet to the tap or shower head which draws air into the water as it flows through the plug. Such a plug may contain a flow responsive component of the type described above. Such an aerated flow gives the impression of a full flow of water at low flow rates, but limits the maximum flow of water which can be achieved without significant enlargement of the tap or shower outlet.

It has also been proposed in U.S. Pat. No. 4,352,462 to form a nozzle, which is used to inject cleansing water into a vessel containing a sludge, with a closure member to prevent back flow of sludge into the fluid flow passages of the nozzle. The closure member comprises an obturator which is spring biased to seat against the exterior of the nozzle housing so as to close off the nozzle outlet when cleansing water is not flowing through the nozzle. The obturator is connected by a rod to a transverse plate which is housed within a wider diameter portion of the fluid flow passage through the nozzle housing. The plate member buts against the shoulders formed in the wall at each end of the larger diameter portion at the extremes of its axial travel and thus limits the axial movement of the obturator. A bias compression coil spring is trapped between the transverse plate and the downstream shoulder to bias the obturator to seat against the nozzle orifice and close the orifice. The sole function of the transverse plate is to limit the axial movement of the obturator and it does not act in any way as a flow regulator.

Furthermore, in its rest position when now water flows through the nozzle, the obturator seals the nozzle orifice so as to prevent ingress of sludge solids into the nozzle orifice. If such a device were used to regulate the flow of cleansing fluid through the nozzle orifice, the pressure acting on the upstream face of the obturator would cause the obturator to oscillate between the open and closed positions for the reasons given above.

Accordingly, the present invention provides a fluid control device comprising an inlet and an outlet orifice, the inlet being connected to the outlet by first and second flow paths, the second flow path comprising a single valve member, wherein, in use, the flow of fluid along the first flow path causes a pressure to act upon the valve member such that: i) the flow of a fluid along the second flow path is prevented by the valve member if the pressure acting on the valve member is less than a threshold value; and ii) the flow of a fluid along the second flow path is allowed by the valve member if the pressure acting on the valve member is greater than a threshold value.

The first flow path and the second flow path may be coaxial or they may be concentrically arranged. The first flow path may discharge a fluid flow into the outlet orifice through an array of apertures. The second flow path may discharge a fluid flow into the outlet orifice through an aerator arrangement or alternatively through a straightener arrangement. Preferably valve member comprises a diaphragm valve. The diaphragm valve may comprise two or more cuts such that when activated the valve defines a substantially regular aperture such as a square, hexagon, octagon, etc. Furthermore, the device may further comprise one or more meshes filters to diffuse fluid flowing through the device and to filter particulates from the fluid flow.

As indicated above, the invention can be applied to fluid dispensing apparatus other than taps and the valve mechanism controlling the flow of water or other fluid through the discharge outlet may be located remotely from the outlet, as with a shower head. The term tap is therefore used herein to denote in general all such dispensing apparatus and the invention will, for convenience be described in terms of a tap or faucet.

The optimum dimensions for the various components of the device, the strength of diaphragm valve and the size of apertures in both flow paths can readily be determined by simple trial and error tests. The device readily lends itself to fabrication of the components from injection moulded or cast engineering plastics or by machining. The components are conveniently assembled upon one another using any suitable technique, for example by the use of adhesive, ultrasonic or other welding or by snap fitting the parts together.

The device is preferably of a generally cylindrical shape so that the internal components and the fluid flow paths through the device are radially substantially symmetrical about the longitudinal axis of the device.

The device is provided with means, for example a screw thread, a bayonet type fitting or a series of circumferential external saw tooth ribs, whereby the device can be secured within the outlet of the tap or other apparatus.

The invention will now be described by way of illustration with respect to preferred embodiments of the invention as shown in the accompanying drawings in which—

Figure 1:
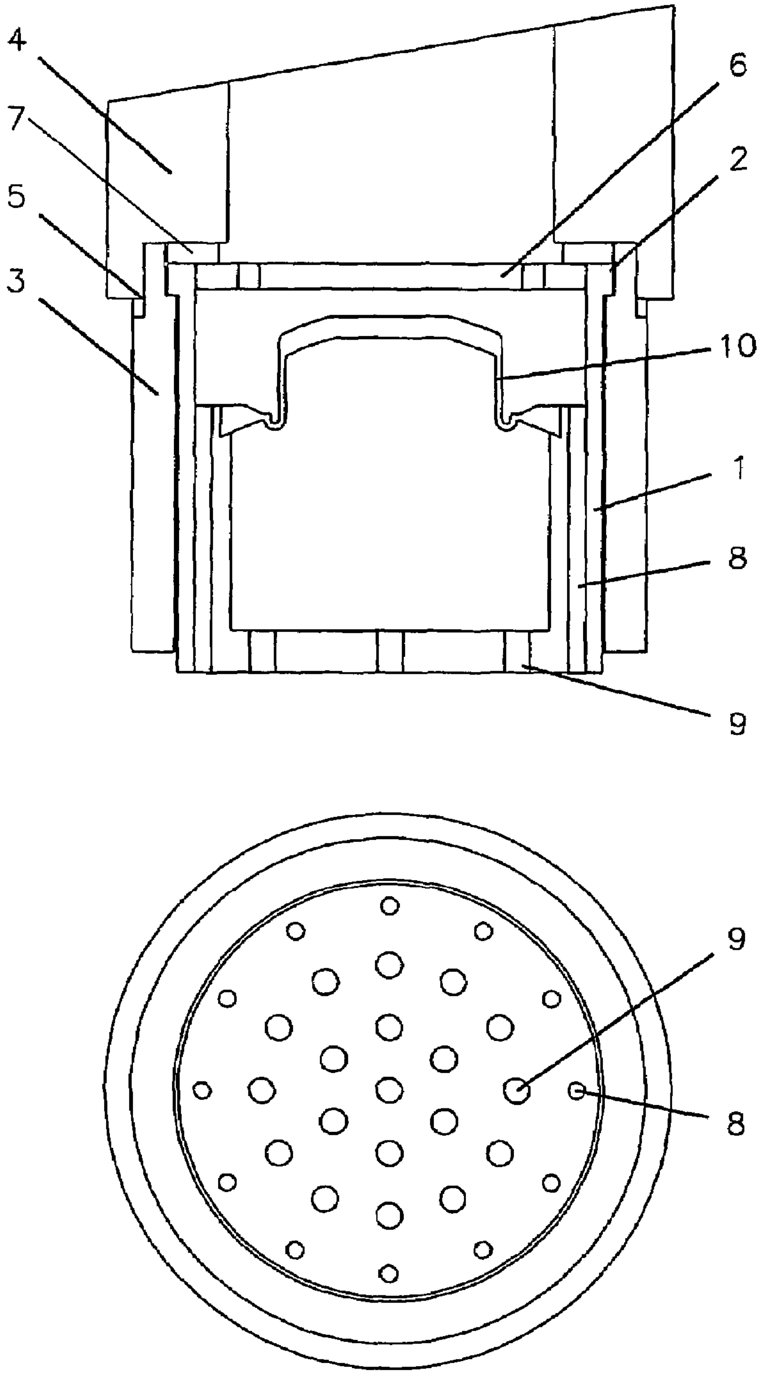
FIGS. 1-3 show schematic depictions of a first embodiment of a device according to the present invention which comprises with an array of holes for high flow discharge.
Figure 2:
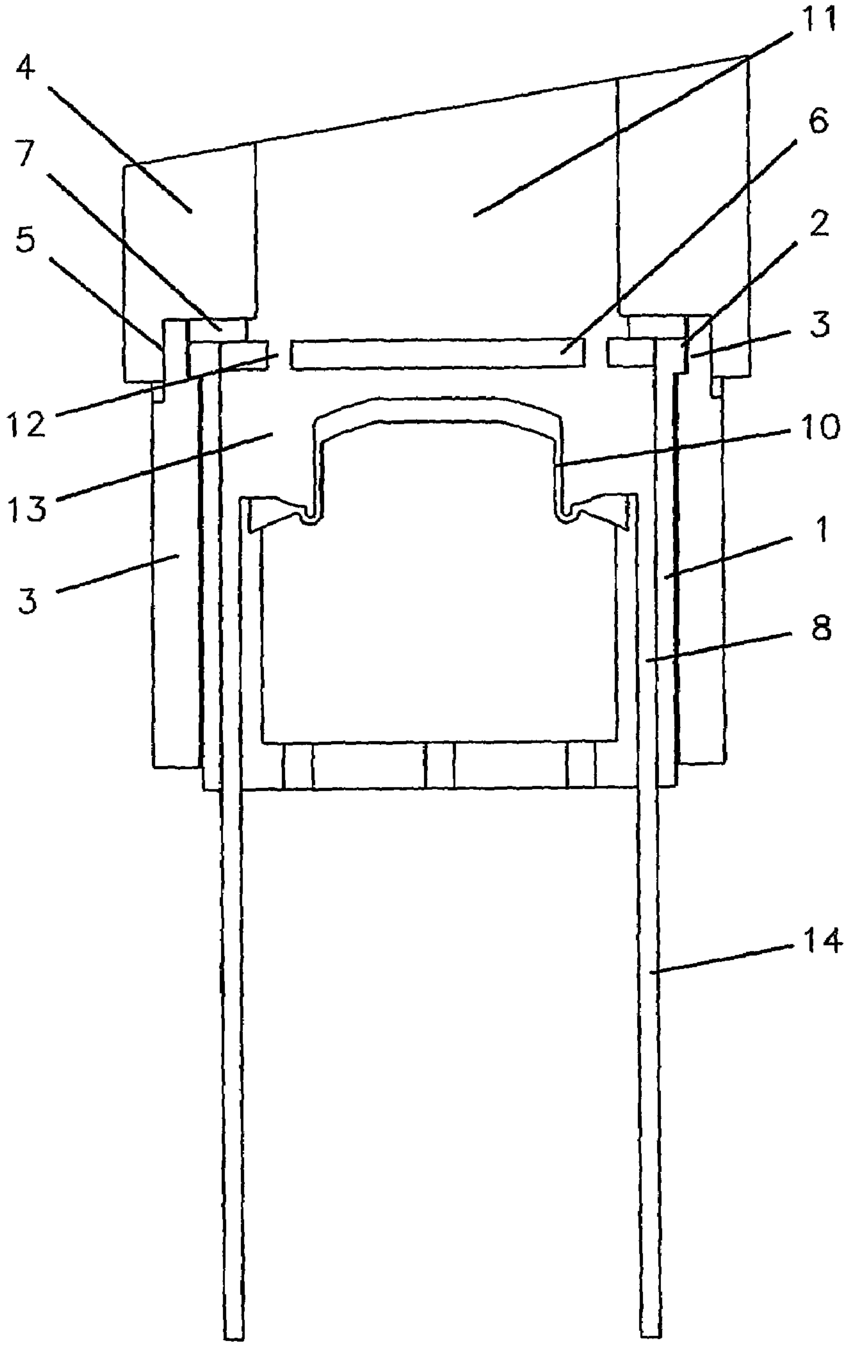
Figure 3:
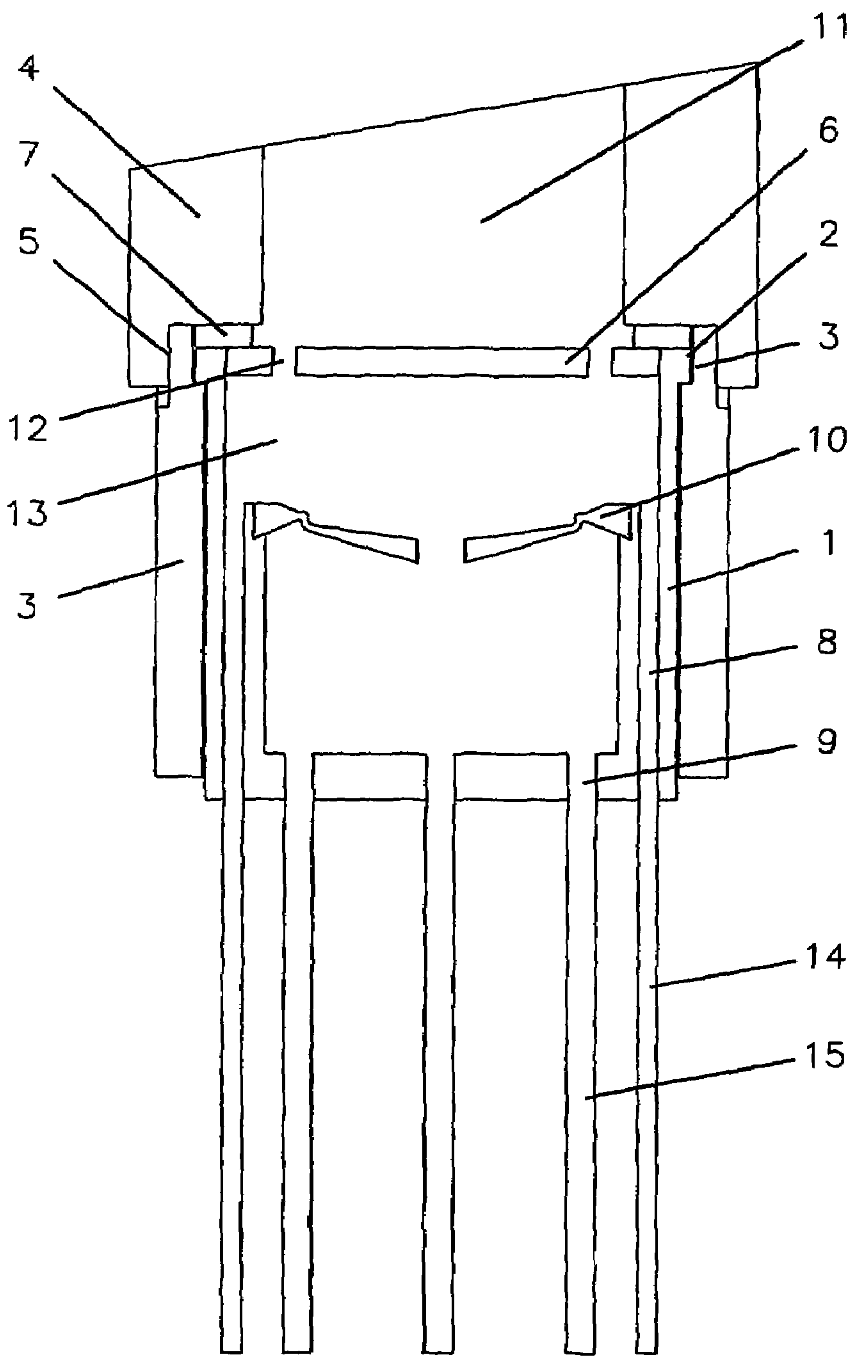

The device shown in FIGS. 1, 2 and 3 comprises a cylindrical body member 1 which has an increased diameter section 2 which locates within the recess of the metal housing ring 3. The metal housing ring 3 is located into the tap housing 4 by a threaded arrangement 5.

The cylindrical body member 1 has a flow restriction plate 6 installed at the input end of the unit which is used to restrict the maximum flow of liquid through the device at a given working pressure. The unit is provided with a sealing washer 7 which is compressed by the top section of the body 1, restrictor plate 6 and the inner section of the tap housing 4.

The flow restrictor 6 can be passive as shown in the drawing consisting of a cylindrical plate with an array of holes or an active pressure compensating system utilising an O ring and taper cone arrangement for example. For the purpose of illustration the flow restrictor will be shown as a simple passive plate. Within the internal cylindrical body member 1 two flow paths 8 and 9 are provided for the discharge of the liquid. The inner of the concentric flow paths 9 are controlled by a diaphragm snap valve 10 which is located concentrically within the bore. The diaphragm snap valve 10 is of the type commonly found in non drip caps and sauce bottles and under normal conditions remains in a closed condition.

FIG. 2 shows the system in the low flow operation. The liquid 11 flows through the tap 4 bore and through the array of holes 12 in the restrictor plate 6. The water enters the chamber 13 where it is distributed towards the outer flow path 8 where it issues as an array of spray jets 14. The pressure that is created within the chamber 13 acts upon the top surface of the diaphragm snap valve 10 but is insufficient to cause the diaphragm snap valve 10 to operate. In this state the low flow rate issuing from the tap bore 4 is converted to an array of spray jets 14.

FIG. 3 shows the system in the high flow operation. As the tap is opened further the increased flow through of liquid 11 flows through the tap 4 bore and through the array of holes 12 in the restrictor plate 6 causes the pressure in the chamber 13 to increase due to the cross axial section of the discharge holes in the outer flow path 8 being fixed. The increased pressure in the chamber 13 caused by the increased flow of liquid through the device acts upon the outer surface of the diaphragm snap valve 10 and at a controlled point the applied pressure acting on the top surface of the diaphragm snap valve 10 is beyond the holding characteristic and this causes the inner sections of diaphragm snap valve 10 to invert and open accordingly. In this state the flow of liquid through the device discharges through the array of spray jets 14 around the outer coaxial flow path 8, the diaphragm snap valve 10 and out through an array of inner jets 15 located within the inner flow path 9 to atmospheric pressure.

The total cross section area of the discharge path 9 controlled by the diaphragm snap valve 10 is designed so that there is always positive pressure acting on the top surface of the valve 10 to retain the valve in the open position whilst the unit is in the high flow mode. The flow rate in which the unit changes is controlled by the cross sectional area of the outer flow path 8 and the characteristic of the valve 10. The change over between the two states is virtually instantaneous, providing two flow states unlike other proposed flow devices which have a proportional output in relation to the flow of liquid through the device.

As the flow rate of the liquid 11 flowing through the tap 4 bore and through the array of holes 12 in the restrictor plate 6 is reduced this causes the pressure in the chamber 13 to decrease due to the cross axial section of the discharge holes in the outer flow path 8 being fixed. This decreased pressure in the chamber 13 is insufficient to retain diaphragm snap valve 10 in the open position and the resilience of the diaphragm snap valve 10 causes the valve to re-close shutting off the flow path 9 to the inner spray jets 15 In this state the reduced low flow rate issuing from the tap bore 4 is converted to an array of spray jets 14.

Figure 4:
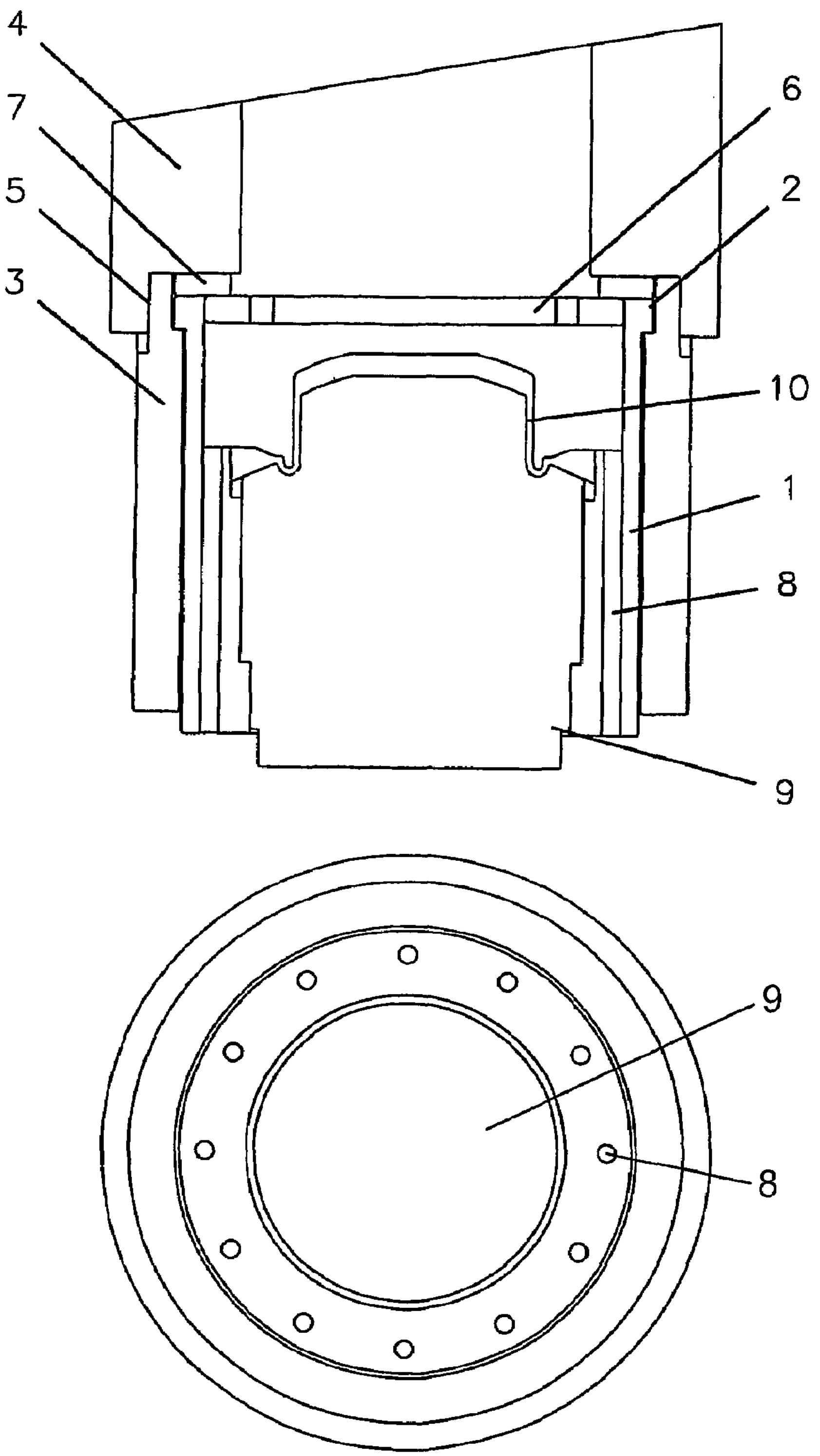
FIGS. 4-6 show schematic depictions of a second embodiment of a device according to the present invention which comprises an aerator or straightener for high flow discharge.
Figure 5:
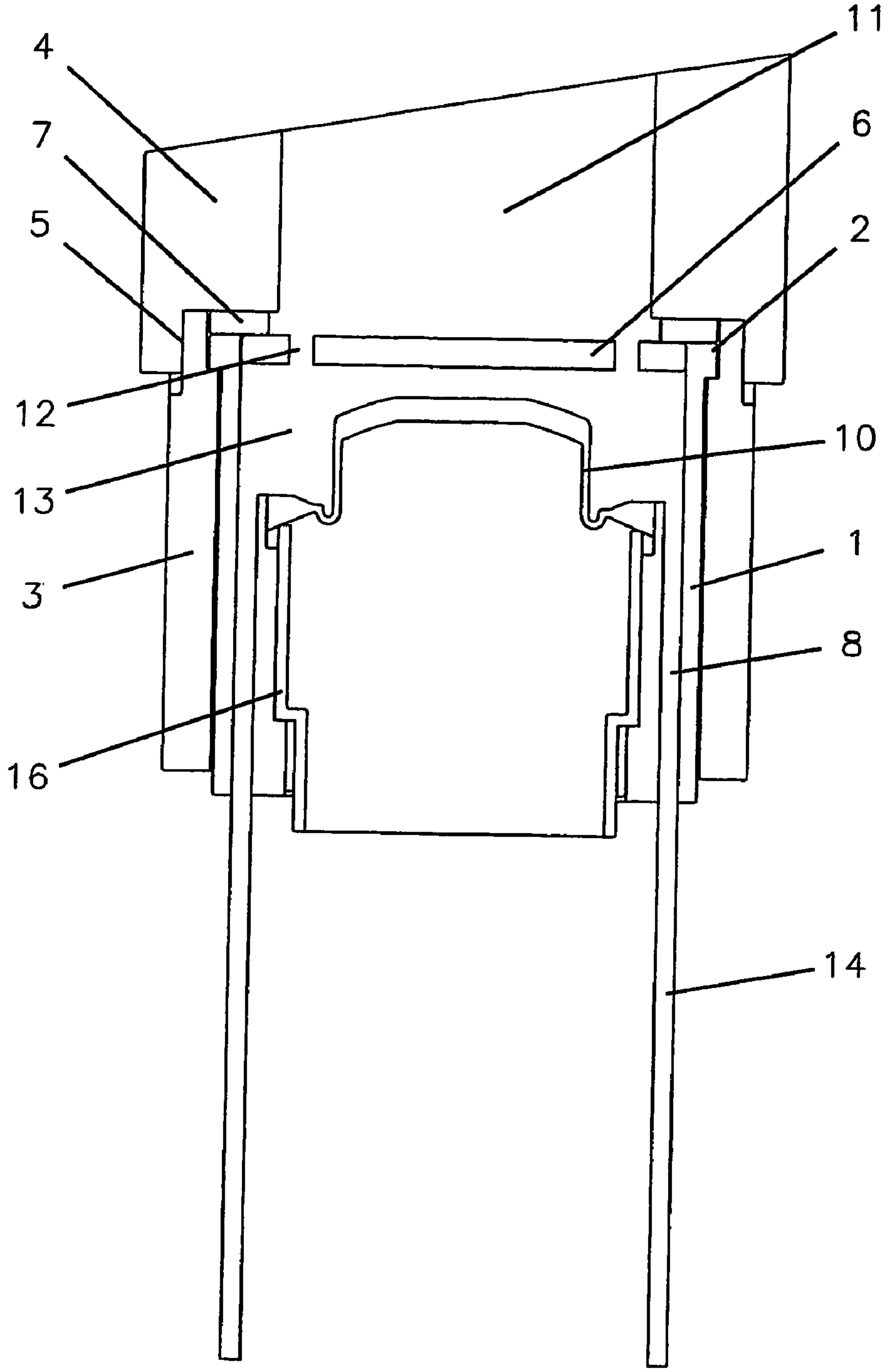
Figure 6:
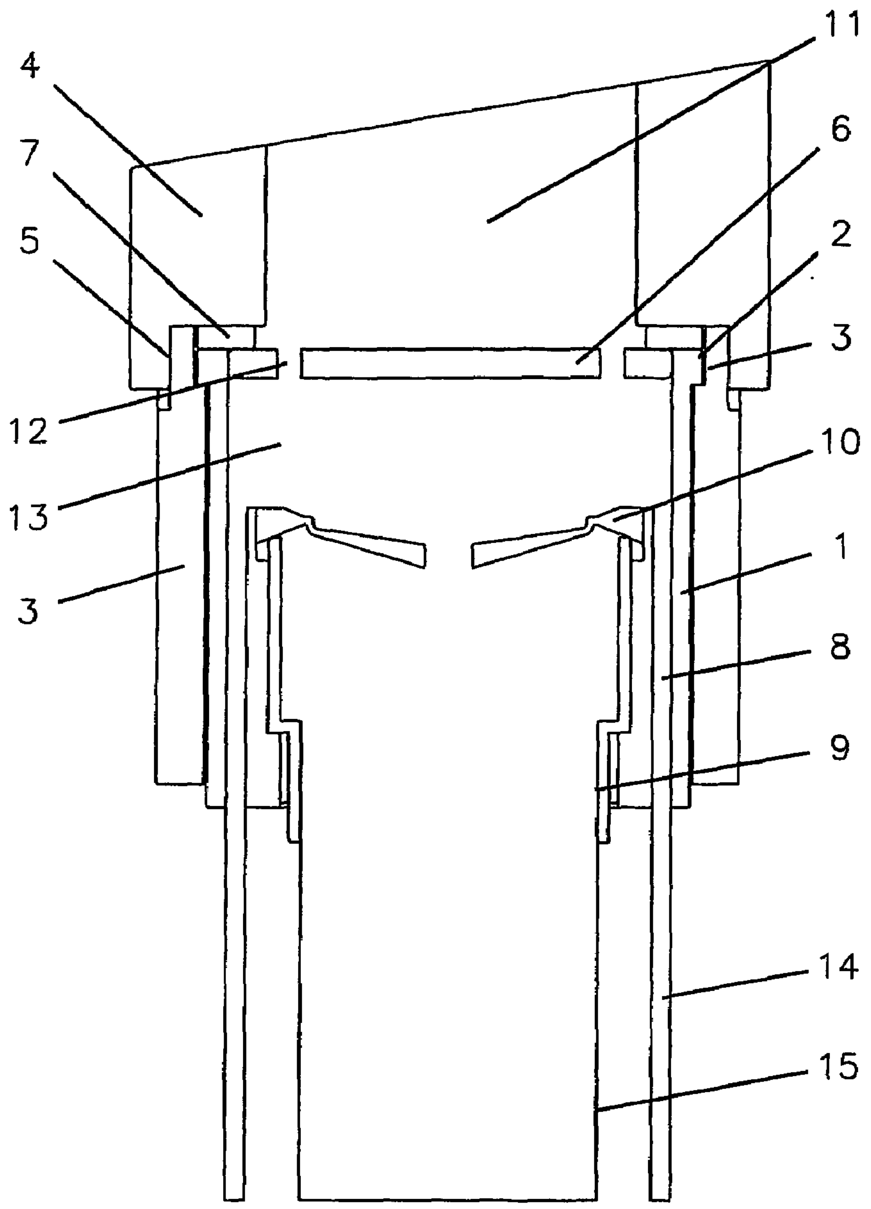

The device shown in FIGS. 4-6 comprises a cylindrical body member 1 which has an increased diameter section 2 which locates within the recess of the metal housing ring 3. The metal housing ring 3 is located into the tap housing 4 by a threaded arrangement 5. The cylindrical body member 1 has a flow restriction plate 6 installed at the input end of the unit which is used to restrict the maximum flow of liquid through the device at a given working pressure. The unit is provided with a sealing washer 7 which is compressed by the top section of the body 1, restrictor plate 6 and the inner section of the tap housing 4. The flow restrictor 6 can be passive as show in the drawing consisting of a cylindrical plate with an array of holes or an active pressure compensating system utilising an O ring and taper cone arrangement for example. For the purpose of illustration the flow restrictor will be show as a simple passive plate.

Within the internal cylindrical body member 1 two flow paths 8 and 9 are provided for the discharge of the liquid. The inner of the concentric flow paths 9 are controlled by a diaphragm snap valve 10 which is located concentrically within the bore. The diaphragm snap valve 10 is of the type commonly found in non drip caps and sauce bottles and under normal conditions remains in a closed condition.

FIG. 5 shows the system in the low flow operation. The liquid 11 flows through the tap 4 bore and through the array of holes 12 in the restrictor plate 6. The water enters the chamber 13 where it is distributed towards the outer flow path 8 where it issues as an array of spray jets 14. The pressure that is created within the chamber 13 acts upon the top surface of the diaphragm snap valve 10 but is insufficient to cause the diaphragm snap valve 10 to operate. In this state the low flow rate issuing from the tap bore 4 is converted to an array of spray jets 14.

FIG. 6 shows the system in the high flow operation. As the tap is opened further the increased flow through of liquid 11 flows through the tap 4 bore and through the array of holes 12 in the restrictor plate 6 causes the pressure in the chamber 13 to increase due to the cross axial section of the discharge holes in the outer flow path 8 being fixed. The increased pressure in the chamber 13 caused by the increased flow of liquid through the device acts upon the outer surface of the diaphragm snap valve 10 and at a controlled point the applied pressure acting on the top surface of the diaphragm snap valve 10 is beyond the holding characteristic and this causes the inner sections of diaphragm snap valve 10 to invert and open accordingly.

In this state the flow of liquid through the device discharges through the array of spray jets 14 around the outer coaxial flow path 8, the diaphragm snap valve 10 and out through an aerator or straightener 16 to atmospheric pressure. Aerators or straighteners 16 are well known and are commonly used to aerate water or soften the output from a tap. The device can be a cartridge unit as detailed in the drawings or could be integrally moulded within the body housing so as to reduce the component count. For the purpose of this description the aerator or straightener 16 will be shown as a cartridge assembly.

The total cross section area of the discharge path through the aerators or straightener 16 controlled by the diaphragm snap valve 10 is designed so that there is always positive pressure acting on the top surface of the valve 10 to retain the valve in the open position whilst the unit is in the high flow mode.

The flow rate in which the unit changes is controlled by the cross sectional area of the outer flow path 8 and the characteristic of the valve 10. The change over between the two states is virtually instantaneous, providing two flow states unlike other proposed flow devices which have a proportional output in relation to the flow of liquid through the device.

As the flow rate of the liquid 11 flowing through the tap 4 bore and through the array of holes 12 in the restrictor plate 6 is reduced this causes the pressure in the chamber 13 to decrease due to the cross axial section of the discharge holes in the outer flow path 8 being fixed. This decreased pressure in the chamber 13 is insufficient to retain diaphragm snap valve 10 in the open position and the memory in the diaphragm snap valve 10 causes the valve to re-close shutting off the flow path 16 to the aerator or straightener. In this state the reduced low flow rate issuing from the tap bore 4 is converted to an array of spray jets 14.

Figure 7:
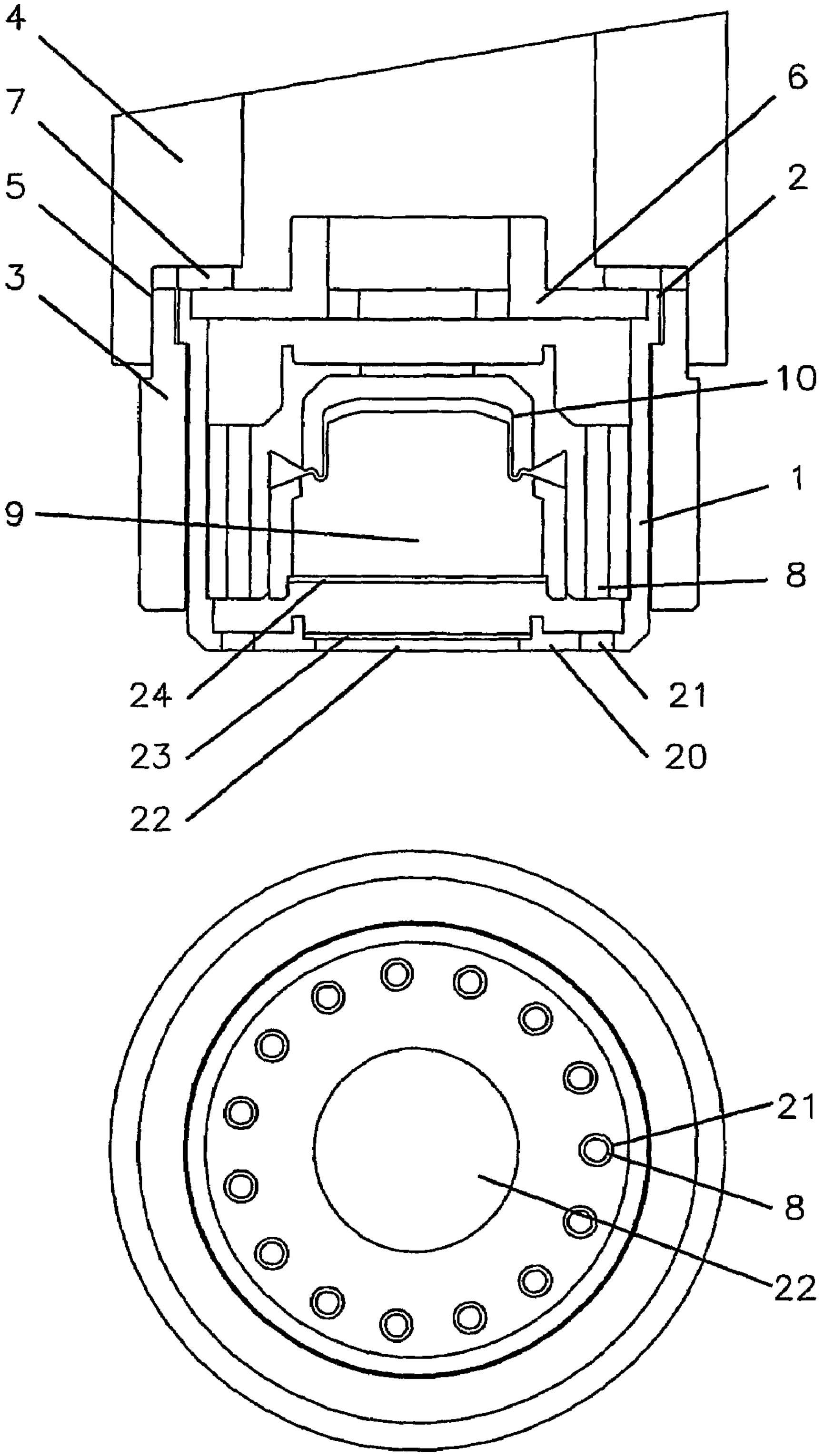
FIGS. 7-9 show schematic depictions of a third embodiment of a device according to the present invention which comprises an additional diffusion plate.
Figure 8:
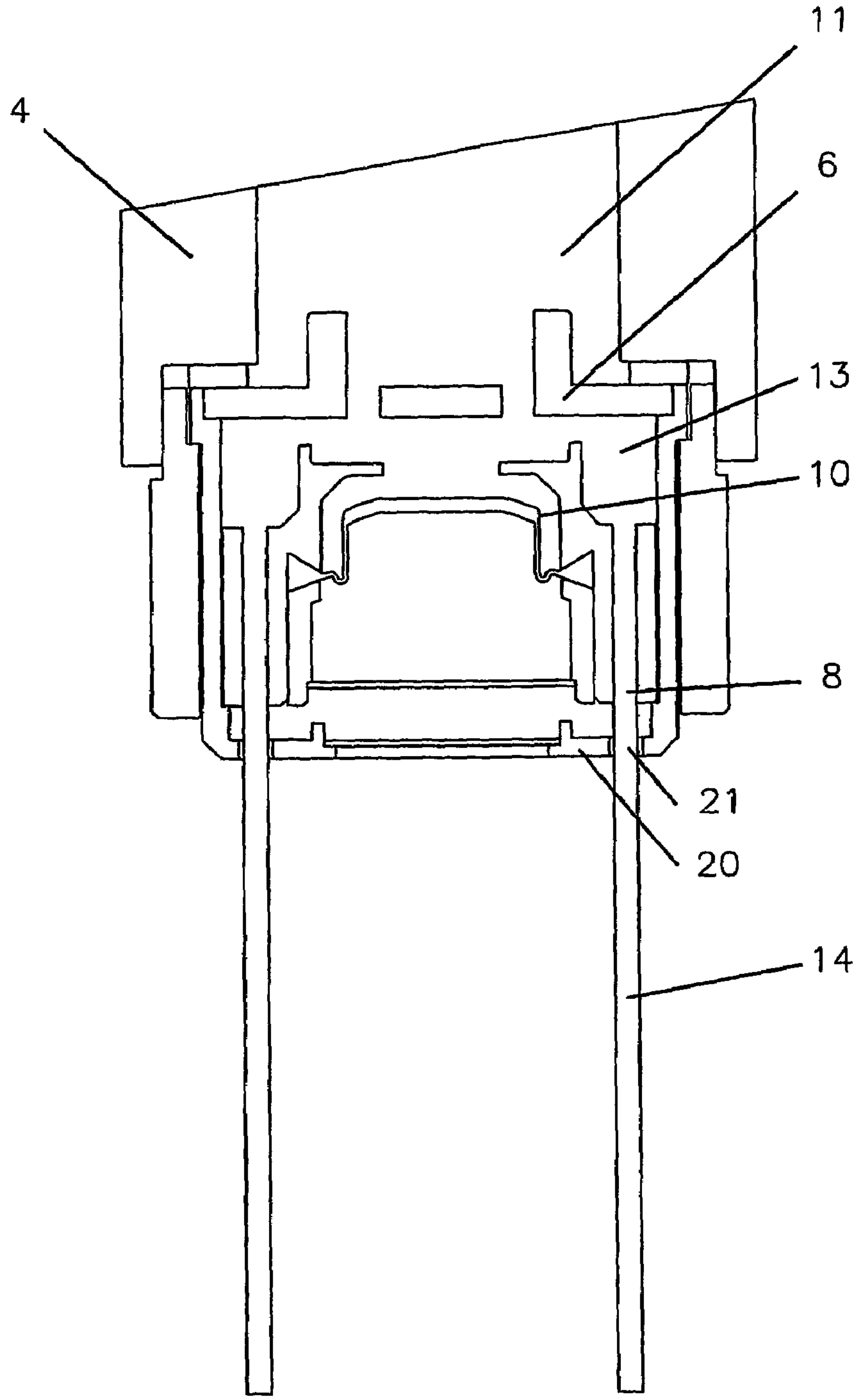
Figure 9:
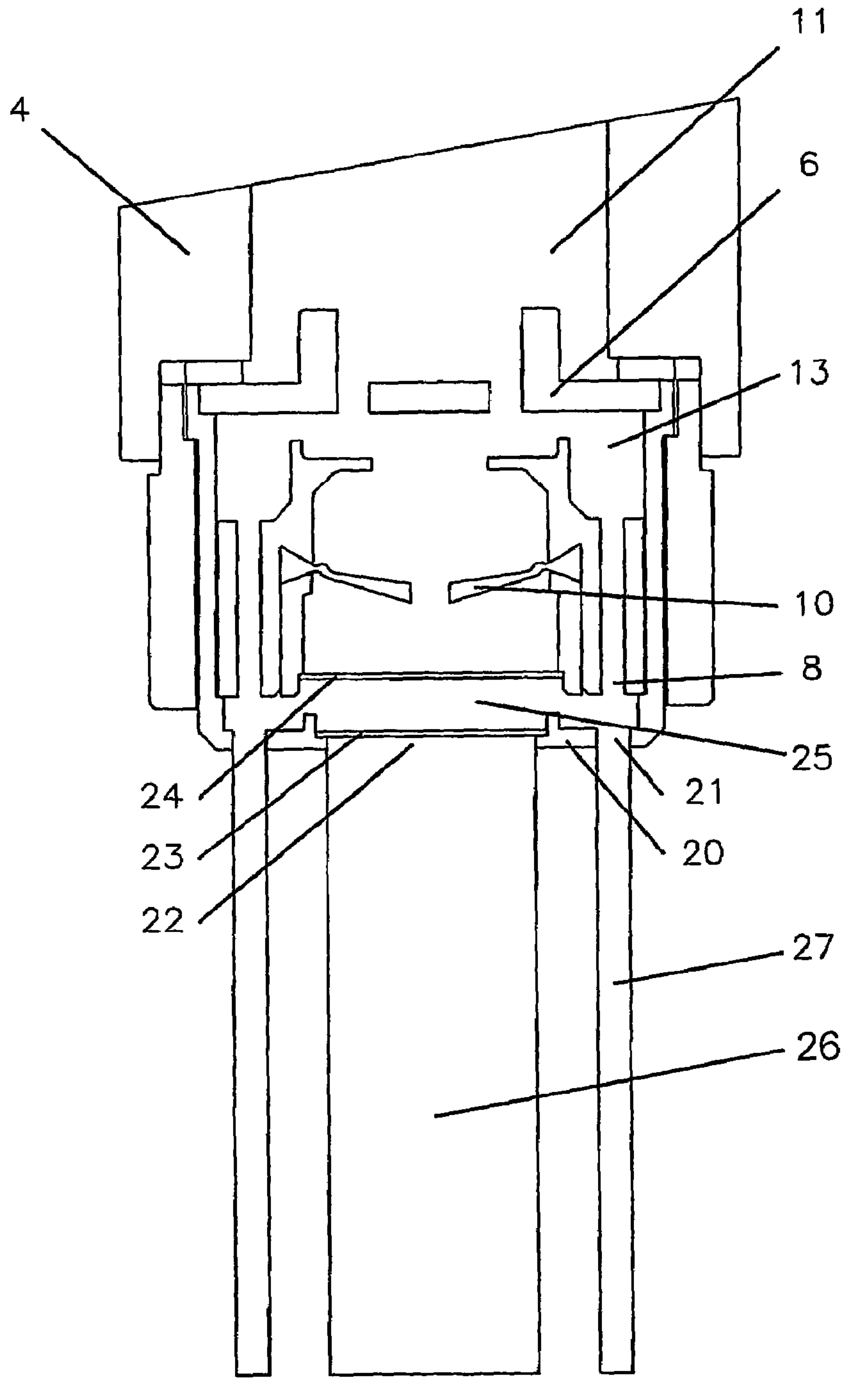

The device shown in FIGS. 7-9 comprises additional features in which the velocity of the spray jets are reduced when in the high flow mode of operation and comprises of a cylindrical body member 1 which has an increased diameter section 2 which locates within the recess of the metal housing ring 3. The metal housing ring 3 is located into the tap housing 4 by a threaded arrangement 5. The cylindrical body member 1 has a flow restriction plate 6 installed at the input end of the unit which is used to restrict the maximum flow of liquid through the device at a given working pressure. The unit is provided with a sealing washer 7 which is compressed by the top section of the body 1, restrictor plate 6 and the inner section of the tap housing 4. The flow restrictor 6 can be an active pressure compensating system utilising an O ring and taper cone as shown in the drawing or passive arrangement consisting of a cylindrical plate with an array of holes. For the purpose of illustration the flow restrictor will be shown as an active pressure compensating system.

Within the internal cylindrical body member 1 two flow paths 8 and 9 are provided for the discharge of the liquid. The inner of the concentric flow paths 9 are controlled by a diaphragm snap valve 10 which is located concentrically within the bore. In this design a parallel plate 20 is located after the spray jets 8 which has an array of holes 21 on the same matrix as the spray jets but are larger in diameter to allow the spray jets 8 to pass unaffected through the lower plate 20. The parallel plate has an aperture 22 which is provide with a mesh screen 23 or other suitable means of diffusion including moulded construction within the housing. The discharge path of the chamber whish contains the valve 10 can be also fitted with a mesh 24 to diffuse the jet of water issuing from the valve under high flow conditions if required.

FIG. 8 shows the system in the low flow operation. The liquid 11 flows through the tap 4 bore and through the active regulator 6. The water enters the chamber 13 where it is distributed towards the outer flow path 8 where it issues as an array of spray jets 14 passes through the larger size holes 21 in the parallel plate 20. The pressure that is created within the chamber 13 acts upon the top surface of the diaphragm snap valve 10 but is insufficient to cause the diaphragm snap valve 10 to operate. In this state the low flow rate issuing from the tap bore 4 is converted to an array of spray jets 14.

FIG. 9 shows the system in the high flow operation. As the tap is opened further the increased flow through of liquid 11 flows through the tap 4 bore and through the active regulator 6 causes the pressure in the chamber 13 to increase due to the cross axial section of the discharge holes in the outer flow path 8 being fixed. The increased pressure in the chamber 13 caused by the increased flow of liquid through the device acts upon the outer surface of the diaphragm snap valve 10 and at a controlled point the applied pressure acting on the top surface of the diaphragm snap valve 10 is beyond the holding characteristic and this causes the inner sections of diaphragm snap valve 10 to invert and open accordingly.

In this state the flow of liquid through the valve 10 is softened and distributed through the primary mesh 24 and into the second chamber 25. Due to the secondary screen 23 creating slight back pressure, chamber 25 fills with water and then discharges via the secondary mesh 23 and aperture 22 forming a soft column of water 26. When the chamber 25 fills with water, the high volume of water interacts with the spray jets 14 issuing through the array of spray holes 8 and reduces the velocity of the spray jets 14 by initially obstructing the jets 14 and then using the energy from the spray jets 8 to drag the surrounding water through the larger holes 21 in the lower plate 20 forming a larger array of spray jets 27 at a lower velocity to be produced. Therefore as a result of the additional components when the unit is used in full flow mode the spray jet velocity and subsequent splash back caused by the spray jets 8 hitting the bowl is significantly reduced over previously disclosed methods. The sizing of the holes in the apertures and meshes can be determined by testing the unit using a variety of hole sizes and mesh configuration.

The total cross section area of the discharge path is designed so that there is always positive pressure acting on the top surface of the valve 10 to retain the valve in the open position whilst the unit is in the high flow mode. The flow rate in which the unit changes is controlled by the cross sectional area of the outer flow path 8 and the characteristic of the valve 10. The change over between the two states is virtually instantaneous, providing two flow states unlike other proposed flow devices which have a proportional output in relation to the flow of liquid through the device.

As the flow rate of the liquid 11 flowing through the tap 4 bore and through the array of holes 12 in the restrictor plate 6 is reduced this causes the pressure in the chamber 13 to decrease due to the cross axial section of the discharge holes in the outer flow path 8 being fixed. This decreased pressure in the chamber 13 is insufficient to retain diaphragm snap valve 10 in the open position and the memory in the diaphragm snap valve 10 causes the valve to re-close. When the valve closes the water issuing from the spray jets 8 drags the surrounding water through the larger holes 21 in the lower plate 20 and drains the volume of liquid in the second chamber 25. When the chamber 25 is empty the spray jets 8 can pass unaffected thorough the lower plate 20 at a velocity proportional to the flow of water through the device. As an alternative, the primary and/or the secondary mesh could be replaced by a matrix of holes if so desired.

Figure 10:
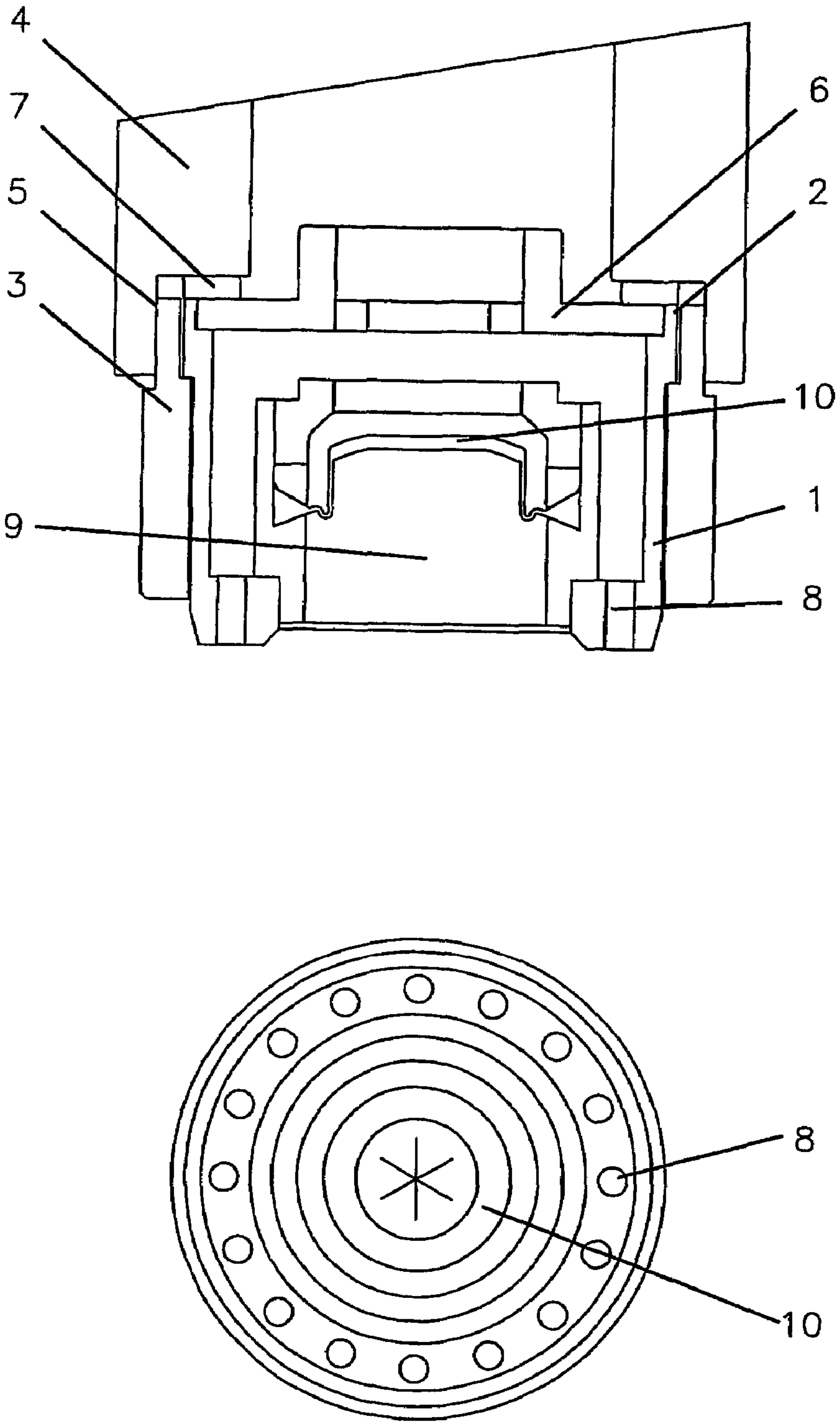
FIGS. 10-12 show schematic depictions of a fourth embodiment of a device according to the present invention which comprises an active regulator diffuser plate and high flow valve.
Figure 11:
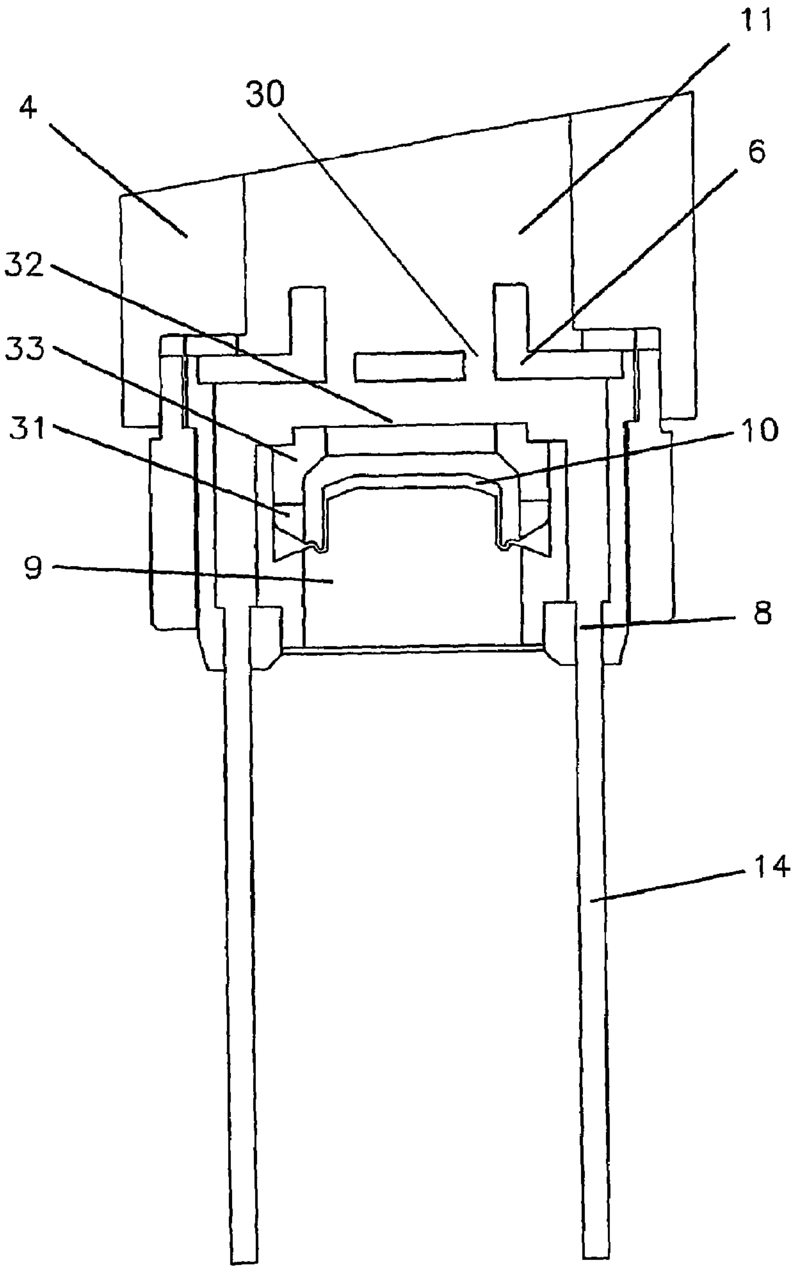
Figure 12:
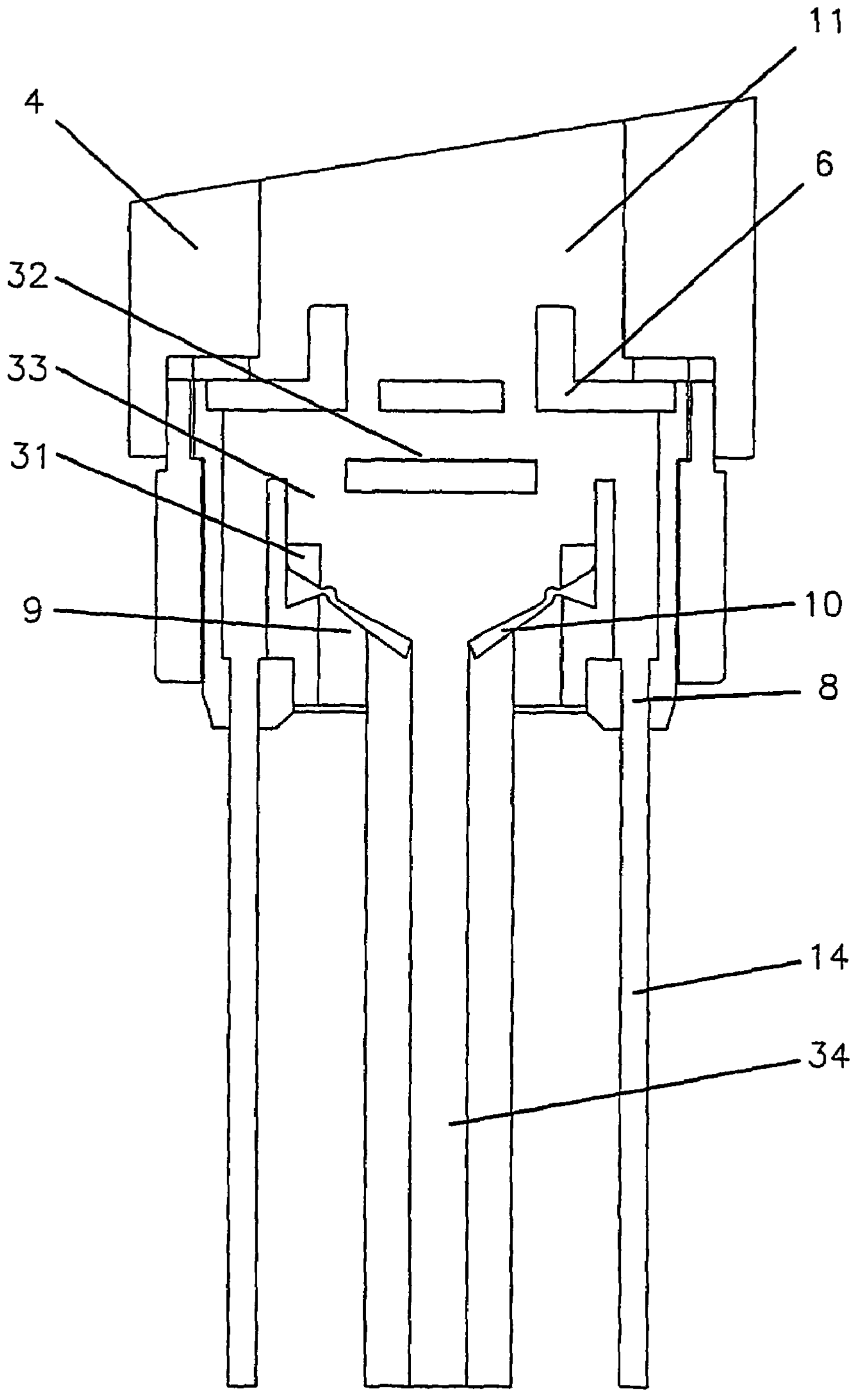

The device shown in FIGS. 10-12 is an alternative embodiment of the present invention in which the velocity of the spray jets are reduced when in the high flow mode of operation by optimising the cross sectional area of the valve opening 10 and therefore maximising the flow of water through the valve 10 and comprises of a cylindrical body member 1 which has an increased diameter section 2 which locates within the recess of the metal housing ring 3. The metal housing ring 3 is located into the tap housing 4 by a threaded arrangement 5.

The cylindrical body member 1 has a flow restriction plate 6 installed at the input end of the unit which is used to restrict the maximum flow of liquid through the device at a given working pressure. The unit is provided with a sealing washer 7 which is compressed by the top section of the body 1, restrictor plate 6 and the inner section of the tap housing 4. The flow restrictor 6 can be an active pressure compensating system utilising an O ring and taper cone as show in the drawing or passive arrangement consisting of a cylindrical plate with an array of holes. For the purpose of illustration the flow restrictor will be show as an active pressure compensating system. Within the internal cylindrical body member 1 two flow paths 8 and 9 are provided for the discharge of the liquid. The inner of the concentric flow paths 9 are controlled by a diaphragm snap valve 10 which is located concentrically within the bore.

FIG. 11 shows the system in the low flow operation. The liquid 11 flows through the tap 4 bore and through the active regulator 6. The water enters the chamber 13 where it is distributed towards the outer flow path 8 where it issues as an array of spray jets 14. Due to the design of active flow regulators the discharge from the outlet port consists of 4 or more small apertures 30 which under normal operation produce an array of high velocity jets. If the active flow regulator 6 is located directly above the silicon diaphragm valve 10 the focused high pressure jest can act against the top surface of the valve and cause the valve to open erratically and prematurely. Also when the valve is in the open mode then the force of these jets travels through the opening and creates a high velocity centre column, both of these results are undesirable for correct operation. To prevent the above problems this embodiment of the design utilises a retaining ring 31 which has a flat surface 32 that is positioned below the active flow regulator and an array of apertures 33 located around the perimeter to allow the water to flow through the valve 10 through the chamber 9 and out to atmosphere.

The pressure that is created within the chamber 13 acts upon the top surface of the diaphragm snap valve 10 but is insufficient to cause the diaphragm snap valve 10 to operate. In this state the low flow rate issuing from the tap bore 4 is converted to an array of spray jets 14.

FIG. 12 shows the system in the high flow operation. As the tap is opened further the increased flow through of liquid 11 flows through the tap 4 bore and through the active regulator 6 causes the pressure in the chamber 13 to increase due to the cross axial section of the discharge holes in the outer flow path 8 being fixed. The increased pressure in the chamber 13 caused by the increased flow of liquid through the device acts upon the outer surface of the diaphragm snap valve 10 and at a controlled point the applied pressure acting on the top surface of the diaphragm snap valve 10 is beyond the holding characteristic and this causes the inner sections of diaphragm snap valve 10 to invert and open accordingly. In this state the flow of liquid through the device discharges initially through the active regulator 6 where it is then diffused by the flat surface 32 of the retaining ring 31 to the outer flow paths 8 where it issues as an array of spray jets 14, and through the array of apertures in the retaining ring 31, through the valve 10 and through the outlet port 9 generating a centre column of water 34.

The design of opening of a silicon valve 10 is well known and is commonly used for the dispersal of food and hygiene products, the opening normally consists of two tangential cuts which form a square opening. The valve is also available in a triple cut format which produces a hexagon on opening and therefore offers a higher flow rate through the valve. Therefore the valve could be constructed having one or more cuts but for the purpose of demonstration we will refer to a valve that is triple cut.

The total cross section area of the discharge path through the discharge path 9 and the flow available through the apertures 33 in the retaining ring 31 is designed so that there is always positive pressure acting on the top surface of the valve 10 to retain the valve in the open position whilst the unit is in the high flow mode. The flow rate in which the unit changes is controlled by the cross sectional area of the outer flow path 8 and the characteristic of the valve 10. The change over between the two states is virtually instantaneous, providing two flow states unlike other proposed flow devices which have a proportional output in relation to the flow of liquid through the device.

As the flow rate of the liquid 11 flowing through the tap 4 bore and through the active flow regulator 6 is reduced this causes the pressure in the chamber 13 to decrease due to the cross axial section of the discharge holes in the outer flow path 8 being fixed. This decreased pressure in the chamber 13 is insufficient to retain diaphragm snap valve 10 in the open position and the memory in the diaphragm snap valve 10 causes the valve to re-close shutting off the central column of water 34.

An additional feature of this design is that because the unit doesn't require meshes or small moulded apertures to diffuse the flow them any particles such as sand of calcium that are suspended in the supplied water can pass through the device without affecting the operation of the unit.

The devices could be provided with an alternative forms in which the cylindrical body member 1 is manufactured in a larger diameter and has a threaded portion allowing the unit to be screwed directly into the tap housing 4 by a threaded arrangement 5. Such a form of device works in the same way as the device of FIGS. 1 to 6 but is in a form which can readily be incorporated into a tap outlet during manufacture of the tap, or to replace a conventional flow straightener or aerator already fitted to the tap outlet. The unit could be produced to fit any male or female threaded applications.

The invention claimed is:

1. A fluid control device for reducing the amount of fluid to be discharged, comprising:

an inlet and an outlet orifice, said inlet being connected to said outlet by first and second flow paths, said second flow path including a single valve member, wherein, in use, the flow of fluid along said first flow path causes a pressure to act upon said valve member such that the flow of a fluid along said second flow path is prevented by said valve member if the pressure acting on said valve member is less than a threshold value, and the flow of a fluid along said second flow path is allowed by said valve member if the pressure acting on said valve member is greater than a threshold value;

wherein said valve member comprises a diaphragm valve;

wherein said inlet orifice, said outlet orifice, said first flow path and said second flow path are coaxial.

2. The fluid control device as set forth in claim 1, wherein there is no significant impediment to a fluid flow along the first flow path.

3. The fluid control device as set forth in claim 1, further comprising:

a housing ring defining a recess, said inlet orifice, and said outlet orifice, said housing ring being attachable to a fluid source;

a cylindrical body member including an increased diameter section being located within said recess of said housing ring, said cylindrical body member defining said first and second flow paths;

a flow restriction plate installed adjacent said increased diameter section of said cylindrical body; and a sealing washer compressed between said cylindrical body member, said restriction plate, and the fluid source.

4. The fluid control device as set forth in claim 3, wherein said first flow path and said second flow path are concentrically arranged.

5. The fluid control device as set forth in claim 1, wherein said first flow path discharges a fluid flow into said outlet orifice through one or more apertures.

6. The fluid control device as set forth in claim 1, wherein said second flow path discharges a fluid flow into said outlet orifice through at least one aperture.

7. The fluid control device as set forth in claim 1, wherein said fluid control device comprises a plurality of outlet orifices.

8. The fluid control device as set forth in claim 1, wherein said second flow path discharges a fluid flow into said outlet orifice through an aerator arrangement.

9. The fluid control device as set forth in claim 1, wherein said second flow path discharges a fluid flow into said outlet orifice through a straightener arrangement.

10. The fluid control device as set forth in claim 3 further comprising a retaining ring positioned in said second flow path and being adapted to retain said diaphragm valve in said cylindrical body.

11. The fluid control device as set forth in claim 10, wherein said diaphragm valve comprises at least two cuts such that when activated said valve defines a substantially regular aperture.

12. The fluid control device as set forth in claim 1 further comprises at least one filter to remove particulates from the fluid flowing through said first and said second flow path.

13. A fluid control device, comprising:

a housing ring defining a recess, said housing being attachable to a fluid source;

a cylindrical body member including an increased diameter section being located within said recess of said housing ring, said cylindrical body member defining inner and outer concentric flow paths;

a flow restriction plate installed adjacent said increased diameter section of said cylindrical body;

a sealing washer compressed between said increased diameter section of said cylindrical body member, said restriction plate, and the fluid source; and a valve located in said inner flow path;

wherein the flow of fluid along said outer flow path causes a pressure to act upon said valve such that the flow of a fluid along said inner flow path is prevented by said valve if the pressure acting on said valve is less than a threshold value, and the flow of a fluid along said inner flow path is allowed by said valve if the pressure acting on said valve is greater than a threshold value.

14. The fluid control device as set forth in claim 13, wherein said flow restriction plate includes at least one hole.

15. The fluid control device as set forth in claim 13, wherein said flow restriction plate includes an O-ring and taper cone arrangement.

16. The fluid control device as set forth in claim 13, wherein said valve is a diaphragm valve.

17. The fluid control device as set forth in claim 16, wherein said diaphragm valve comprises at least two cuts such that when activated said valve defines a substantially regular aperture.

18. The fluid control device as set forth in claim 13 further comprising an array of spray jets.

19. The fluid control device as set forth in claim 14 further comprising a parallel plate located after said spray jets, said parallel plate including a mesh screen and an array of holes on the same matrix as said spray jets.

20. A fluid control device, comprising:

a housing ring having a threaded section adapted to be attached to a tap housing, said housing ring defining a recess;

a cylindrical body member including an increased diameter section being located within said recess of said housing ring, said cylindrical body member defining inner and outer concentric flow paths;

a flow restriction plate installed adjacent said increased diameter section of said cylindrical body;

a sealing washer compressed between said cylindrical body member, said restriction plate, and the fluid source;

a diaphragm valve located in said inner flow path, said diaphragm valve including at least two cuts such that when activated said valve defines a substantially regular aperture;

an array of spray jets in communication with said inner and outer flow paths;

a parallel plate located after said spray jets, said parallel plate including a mesh screen and an array of holes on the same matrix as said spray jets; and a retaining ring positioned in said inner flow path and being adapted to retain said diaphragm valve in position, said retaining ring having a flat surface positioned below said flow restriction plate adapted to diffuse fluid flow from said restriction plate, and an array of apertures defined around the perimeter thereof.

* * * * *